(No Model.) 2 Sheets—Sheet 1.

H. BEIMLING.
CENTRIFUGAL CREAMER.

No. 327,756. Patented Oct. 6, 1885.

WITNESSES: A. P. Grant, W. F. Kirches

INVENTOR: Hy. Beimling, BY John A. Biederoheim ATTORNEY.

(No Model.) 2 Sheets—Sheet 2.
H. BEIMLING.
CENTRIFUGAL CREAMER.
No. 327,756. Patented Oct. 6, 1885.
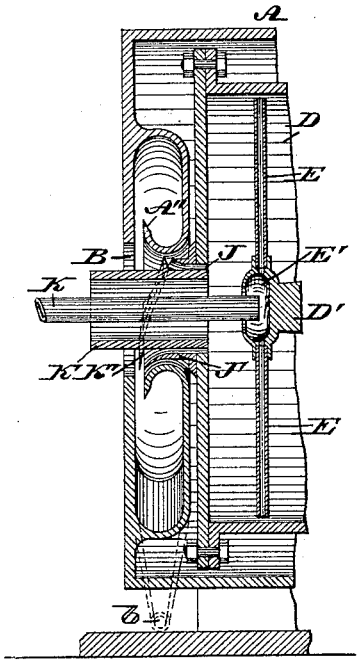
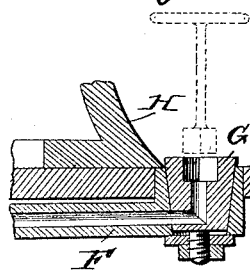
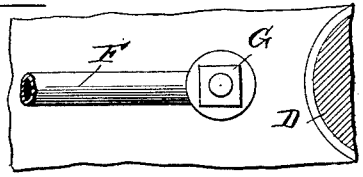
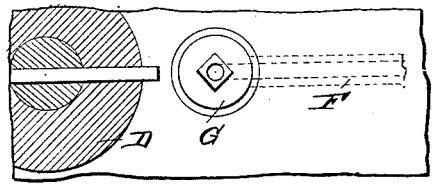
WITNESSES:
A. P. Grant
W. F. Kircher
INVENTOR:
Hy. Beimling,
BY Joshua Biedersheim
ATTORNEY.

UNITED STATES PATENT OFFICE.

HENRY BEIMLING, OF PHILADELPHIA, PENNSYLVANIA, ASSIGNOR OF TWO-THIRDS TO LOUIS KRAUTTER AND GEORGE H. ORCUTT, BOTH OF SAME PLACE.

CENTRIFUGAL CREAMER.

SPECIFICATION forming part of Letters Patent No. 327,756, dated October 6, 1885.

Application filed July 1, 1884. Serial No. 136,538. (No model.)

*To all whom it may concern:*

Be it known that I, HENRY BEIMLING, a subject of the Emperor of Germany, residing in the city and county of Philadelphia, State of Pennsylvania, have invented a new and useful Improvement in Centrifugal Creamers, which improvement is fully set forth in the following specification and accompanying drawings, in which—

Figure 1:
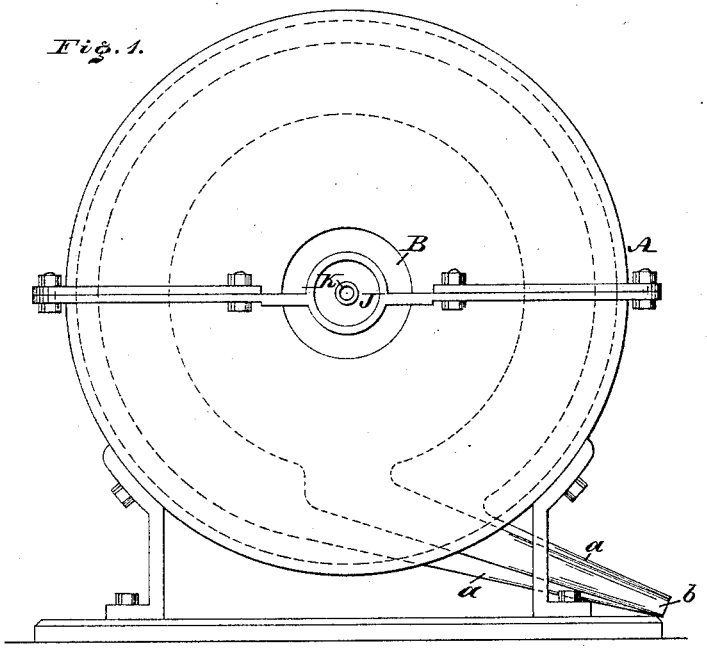
Figure 2:
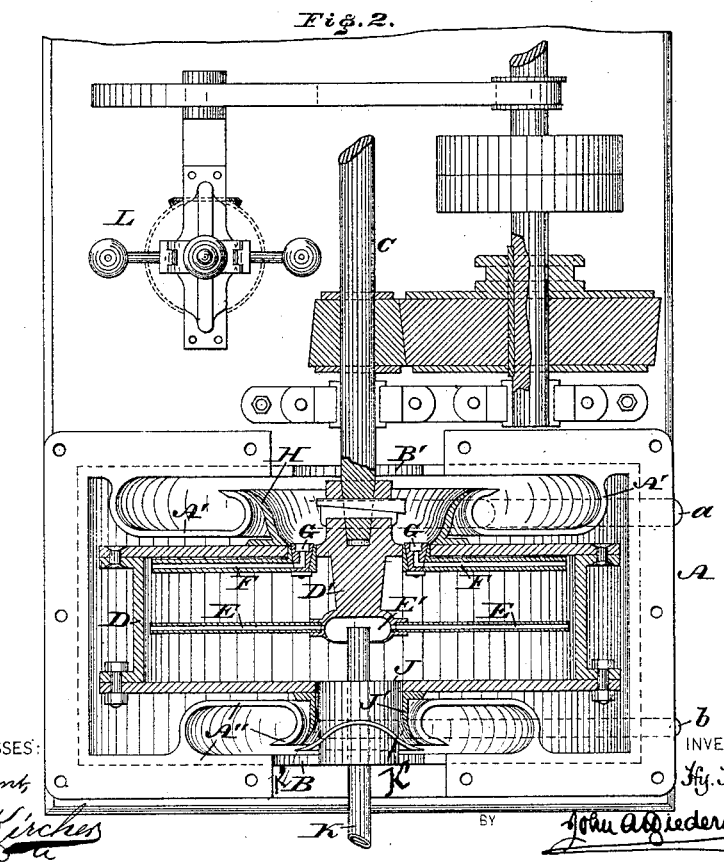

Figure 1 is a side elevation of a milk and cream separator embodying my invention. Fig. 2 is a top or plan view, a portion being in central horizontal section. Fig. 3 represents a vertical central section of a portion thereof. Fig. 4 represents a section of a portion shown in Fig. 2 on an enlarged scale. Figs. 5 and 6 represent front and rear elevations of the portion shown in Fig. 4.

Similar letters of reference indicate corresponding parts in the several figures.

My invention consists in constructing a machine for obtaining all the cream from milk in a most expeditious and thorough manner, the parts and operation of which will be detailed hereinafter and claimed.

Referring to the drawings, A represents a cylindrical housing or casing, which is properly mounted on a base or stand, and having on its sides the openings B and B'. Secured to shaft C is a cylinder, D, which is fitted to be rotated within the housing A by means of proper gearing, friction-pulleys being shown in the drawings in this case.

Secured to the projecting hub D' of the cylinder D are radiating pipes E, which are fitted to a common pocket, E', in the end of the hub D', and about central of the cylinder D.

Within the cylinder D, and secured thereto on the side containing the hub D' thereof, are pipes F, which radiate from the hub and are open at both ends, and communicate with both the interior and exterior of said cylinder. Cocks G are provided, which serve to control the flow through the pipes F. A guard, H, surrounding the cocks G, serves to direct the flow from the pipes F to a proper place of deposit, as will be more fully explained hereinafter.

The wall of the cylinder D opposite to the one having the pipes F has a central opening, J, surrounded by a hood or guard, J', which serves to direct portions of the product into proper receptacles, as will be more fully described.

A supply-pipe, K, enters the opening J, and, passing into the cylinder D, has its outlet in the pocket E'. The supply-pipe K is surrounded by an annulus, K', around which is a guard, J', and the position of these two parts K' J' leaves or forms an annular opening, through which the cream finds an exit to the receptacle produced by the flange A''.

L is a governor driven by the mechanism which drives the shaft C by means of a belt-connection, and serves to control the uniform running of the parts.

The operation is as follows: The machine having been set in motion through the shaft C, warm fresh milk is admitted through the pipe K into the pocket E', from whence, by centrifugal force, the milk is driven through the pipes E into the cylinder D against the inside circumference thereof, and thus evenly distributed. Through the rotation of the cylinder D the milk is being continually agitated, thus compelling the heavy particles—such as dirt, water, and caseous matter—to seek the more distant or outer places of the cylinder, and the lighter substance—*i. e.*, cream—to rise toward the center thereof. As milk is being constantly introduced through the pipe K, the particles being thus crowded seek an escape through the pipes F and cocks G, being thus directed to the guard H, and so enter a hollow circular chamber formed by a flange, A', on the inside of the housing A, being then and there collected and conveyed by the pipe *a* to the desired place of deposit. The particles of cream being forced to the center overflow through the opening formed between the annulus K' and guard J', and are directed by the guard J' into the hollow circular chamber formed by the flange A'' of the housing A, and conveyed by means of a pipe, *b*, to the desired place of collection.

It is evident that by controlling the flow through the cocks G, as has been fully described above, and the flow through the pipe K, the amount of the fluid forced through the opening J can be controlled, and thus controlling the quality of the cream separated from the milk.

The supply of milk is governed by a suitable cock on the pipe K. As the proportion of cream to caseous and aqueous matter is about as one to seven, it is evident that the cream finds ample room to flow out through the annular opening as rapidly as formed without ever rising as high as the opening in the annulus K'. The guard K" on the outer ends of the periphery of the annulus K' serves to prevent the return of any cream or other matter from the chamber or receptacle formed by the flanges A".

As can be readily seen from Fig. 2, the machine can be duplicated without the use of additional driving mechanism.

It will be noticed that Fig. 2 is an irregular horizontal section, showing the pipe K passing through the boss or sleeve K', which sleeve is not cut in the said figure; hence the dotted lines representing the part of the pipe K within the sleeve.

Having thus described my invention, what I claim as new, and desire to secure by Letters Patent, is—

1. A hollow cylinder having a hub, within the interior portion of which is a pocket, E', having pipes leading radially therefrom to near the inner side of the circumferential wall of the cylinder, in combination with a supply-pipe passing through one of the ends of the said cylinder into the said pocket, and bent pipes F, opening at one end inside of the cylinder near the inner side of the circumferential wall, and having at the other ends thereof cocks opening outside of one of the ends of the cylinder near the hub, substantially as described.

2. A cylinder having a hub formed with a pocket, E', and pipes E, leading therefrom and provided with an opening, J, in combination with a guard, J', inlet-pipe K, an annulus, K', having a flange, K", flange A", and pipe b, substantially as and for the purpose set forth.

3. A centrifugal milk and cream separator composed of a hollow cylinder provided with a hub having a bearing in a suitable casing, said hub having a pocket within said cylinder and pipes leading from said pocket to near the circumferential wall thereof, milk-discharge pipes open at both ends leading from the side of said cylinder, cocks in said pipes, and a cream-outlet formed by a guard, J', and annulus K' on the opposite side from the milk-discharge, substantially as described.

HENRY BEIMLING.

Witnesses:
JOHN A. WIEDERSHEIM,
JNO. K. PLITT.